(12) United States Patent
Sung et al.

(10) Patent No.: US 9,609,651 B1
(45) Date of Patent: Mar. 28, 2017

(54) EXCHANGING UPLINK AND DOWNLINK CARRIER FREQUENCIES

(71) Applicant: Sprint Spectrum L.P., Overland Park, KS (US)

(72) Inventors: Sanghoon Sung, Ashburn, VA (US); Yun Sung Kim, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 143 days.

(21) Appl. No.: 14/592,556

(22) Filed: Jan. 8, 2015

(51) Int. Cl.
*H04W 72/04* (2009.01)
*H04L 12/911* (2013.01)

(52) U.S. Cl.
CPC ....... *H04W 72/0453* (2013.01); *H04L 47/827* (2013.01)

(58) Field of Classification Search
CPC .......................... H04L 47/827; H04W 72/0453
See application file for complete search history.

(56) References Cited

U.S. PATENT DOCUMENTS

| | | | |
|---|---|---|---|
| 6,308,294 B1 | 10/2001 | Ghosh et al. | |
| 6,631,127 B1 | 10/2003 | Ahmed et al. | |
| 6,697,987 B2 | 2/2004 | Lee et al. | |
| 6,925,132 B2 | 8/2005 | Song et al. | |
| 7,002,993 B1 | 2/2006 | Mohaban et al. | |
| 7,136,929 B2 | 11/2006 | Koprivica | |
| 7,206,280 B1 | 4/2007 | Khan et al. | |
| 7,388,919 B2 | 6/2008 | Varma et al. | |
| 7,447,968 B2 | 11/2008 | Ha et al. | |
| 7,715,347 B2 | 5/2010 | Yoon et al. | |
| 7,978,626 B1 | 7/2011 | Khanka et al. | |
| 2004/0141525 A1 | 7/2004 | Bhushan et al. | |
| 2004/0179475 A1 | 9/2004 | Hwang et al. | |
| 2006/0013216 A1 | 1/2006 | Rajkotia et al. | |

(Continued)

FOREIGN PATENT DOCUMENTS

WO    2007/059523    5/2007

OTHER PUBLICATIONS

3GPP Long Term Evolution (LTE), May 15, 2012, 4 pages, http://4g-lte-world.blogspot.com/2012/05/tti-bundling-in-lte.html?m=1.

(Continued)

*Primary Examiner* — Hoon J Chung

(57) ABSTRACT

A wireless air interface may be defined for communication with a wireless communication device (WCD). The wireless air interface may include paired low-frequency channels and paired high-frequency channels, where the paired low-frequency channels include a low-frequency downlink channel and a low-frequency uplink channel, and where the paired high-frequency channels include a high-frequency downlink channel and a high-frequency uplink channel. It may be determined that, on at least one of the downlink or uplink channels, the WCD is experiencing a quality of wireless coverage below a threshold wireless coverage value. Possibly in response to the WCD experiencing the quality of wireless coverage below the threshold wireless coverage value, the downlink and uplink channels may be reconfigured so that the paired low-frequency channels include two low-frequency uplink channels and the paired high-frequency channels include two high-frequency downlink channels.

20 Claims, 6 Drawing Sheets

(56) References Cited

U.S. PATENT DOCUMENTS

| | | |
|---|---|---|
| 2006/0109810 A1 | 5/2006 | Au et al. |
| 2007/0070952 A1 | 3/2007 | Yoon et al. |
| 2007/0091816 A1 | 4/2007 | Lee et al. |
| 2007/0110095 A1 | 5/2007 | Attar et al. |
| 2007/0168822 A1 | 7/2007 | Vitebsky et al. |
| 2007/0214400 A1 | 9/2007 | Smith et al. |
| 2007/0300120 A1 | 12/2007 | Kim et al. |
| 2008/0130643 A1 | 6/2008 | Jain et al. |
| 2008/0168321 A1 | 7/2008 | Lim et al. |
| 2008/0194284 A1 | 8/2008 | Choi et al. |
| 2009/0016265 A1 | 1/2009 | Katayama et al. |
| 2009/0129276 A1 | 5/2009 | Dendy |
| 2009/0163208 A1 | 6/2009 | Rao |
| 2009/0319854 A1 | 12/2009 | Qian et al. |
| 2009/0327443 A1 | 12/2009 | Pawar et al. |
| 2010/0091735 A1 | 4/2010 | Kim et al. |
| 2010/0135156 A1 | 6/2010 | Sarkar |
| 2012/0039227 A1 | 2/2012 | Chen et al. |
| 2012/0188886 A1* | 7/2012 | Chen ................. H04L 5/001 370/252 |
| 2013/0114578 A1 | 5/2013 | Lim et al. |
| 2013/0195058 A1* | 8/2013 | Ode .................. H04W 72/048 370/329 |
| 2015/0087352 A1* | 3/2015 | Lim ................. H04W 72/0453 455/522 |

OTHER PUBLICATIONS

IEEE 802.16 Broadband Wireless Access Working Group <http://ieee802.org/16>, Aggregated H-ARQ, Lim Geunhwi, et al., Nov. 3, 2004, 6 pages.

LTE Quick Reference, RSRP (References Signal Received Power), ShareTechnote, Jun. 6, 2014, 3 pages, http://www.sharetechnote.com/html/Handbook_LTE_RSRP.html.

LTE Quick Reference, TTI Bundling, ShareTechnote, Jun. 6, 2014, 2 pages, http://www.sharetechnote.com/html/Handbook_LTE_TTIBundling.html.

Sekhar, Expert Opinion, TTI Bundling in FDD and TD-LTE, Aug. 13, 2012, 4 pages, http://lteuniversity.com/get_trained/expert_opinion1/b/sekhar/archive/2012/08/13/tti-bundling-in-fdd-and-td-lte.aspx.

Wannstrom, Jeannette, for 3GPP, "Carrier Aggregation explained," http://www.3gpp.org/technologies/keywords-acronyms/101-carrier-aggregation-explained, Jun. 2013, pp. 1-6.

"LTE CA: Carrier Aggregation Tutorial," http://www.radio-electronics.com/info/cellulartelecomms/lte-long-term-evolution/4g-lte-advanced-carrier-channel-aggregation.php, Jul. 15, 2014, pp. 1-9.

Vivanco et al., U.S. Appl. No. 14/310,909, filed Jun. 20, 2014, 42 pages.

Oroskar et al., U.S. Appl. No. 14/281,412, filed May 19, 2014, 37 pages.

Oroskar et al., U.S. Appl. No. 14/337,861, filed Jul. 22, 2014, 34 pages.

RF Wireless WorldHome of RF and Wireless Vendors and Resources, LTE EARFCN to Frequency Conversion, http://www.rfwirelessworld.com/Terminology/LTEEARFCNtofrequencyconversion.html, 2014, pp. 1-5.

ETSI, "LTE; Evolved Universal Terrestrial Radio Access (E-UTRA); User Equipment (UE) radio transmission and receiption (3GPP TS 36.101 version 12.5.0 Release 12)", ETSI TS 136 101 V12.5.0 (Nov. 2014), Nov. 2014, 538 pages.

ETSI, LTE; Evolved Universal Terrestrial Radio Access (E-UTRA); FDD repeater radio transmission and reception (3GPP TS 36.106 version 8.0.0 Release 8), ETSI TS 136 106 V8.0.0 (Jan. 2009), Jan. 2009, 39 pages.

ETSI, LTE; Evolved Universal Terrestrial Radio Access (E-UTRA); User Equipment (UE) procedures in idle mode (3GPP TS 36.304 version 12.2.0 Release 12), ETSI TS 136 304 V12.2.0 (Sep. 2014), Sep. 2014, 39 pages.

ETSI, LTE; Evolved Universal Terrestrial Radio Access (E-UTRA); Medium Access Control (MAC) protocol specification (3GPP TS 36.321 version 12.3.0 Release 12), ETSI TS 136 321 V12.3.0 (Oct. 2014), Oct. 2014, 59 pages.

ETSI, LTE; Evolved Universal Terrestrial Radio Access (E-UTRA); Radio Resource Control (RRC); Protocol specification (3GPP TS 36.331 version 12.3.0 Release 12), ETSI TS 136 331 V12.3.0 (Sep. 2014), Sep. 2014, 383 pages.

* cited by examiner

EXCHANGING UPLINK AND DOWNLINK CARRIER FREQUENCIES

BACKGROUND

Wireless networks may provide packet-based services to wireless communication devices (WCDs). For example, a radio access network (RAN) may define one or more wireless coverage areas through which the WCDs may obtain wireless communication services from the RAN. A particular WCD may communicate with the RAN via one or more of the RAN's base stations. In order to make this communication more efficient, for example, the RAN may assign one or more pairs of uplink and downlink channels to the WCD. However, the quality of communications via the assigned channels' carrier frequencies may change over time.

OVERVIEW

In a wireless communication system, a base station may provide one or more wireless coverage areas, such as cells or sectors, through which the base station may serve WCDs. These WCDs may include cell phones, wirelessly-equipped personal computers or tablets, tracking devices, embedded wireless communication modules, or other devices equipped with wireless communication functionality (whether or not operated by a human user). In general, each wireless coverage area may operate on one or more carrier frequencies, and may form respective downlink channels for carrying communications from the base station to WCDs and respective uplink channels for carrying communications from the WCDs to the base station. Such carrier frequencies may be frequency-division duplex (FDD), in which pairs of downlink and uplink channels are defined as separate respective ranges of frequency, or time-division duplex (TDD), in which the downlink and uplink channels are defined on a common range of frequencies, but distinguished from one another through time-division multiplexing. Further, downlink channels and uplink channels may also be divided into respective sub-channels for carrying particular communications, such as one or more control channels for carrying control signaling and one or more traffic channels for carrying application-layer data and other bearer traffic.

For instance, in a system operating according to an orthogonal frequency-division multiple access (OFDMA) protocol, such as the Long Term Evolution (LTE) standard of the Universal Mobile Telecommunications System (UMTS), the air interface is divided over time into frames and sub-frames. Each sub-frame defines two time slots, and the uplink and downlink channels are each divided frequency-wise into sub-carriers that are grouped into resource blocks within each time slot. When a WCD is positioned within coverage of a base station in such a system, the WCD may register or "attach" with the base station on a particular carrier frequency, and the base station may then schedule particular downlink and uplink resource blocks on that carrier frequency to carry data communications to and from the WCD. Further, the base station and WCD may modulate their air interface data communications at a coding rate selected based on quality of the WCD's coverage, such as with higher rate coding rate when the WCD is in better coverage of the base station and with a lower coding rate when the WCD is in worse coverage of the base station.

In such an LTE system, for instance, when the base station has data to transmit to a WCD, the base station may assign certain downlink resource blocks (and thus certain sub-carriers) in a particular sub-frame to carry the data to the WCD at a particular coding rate. The base station may then (i) in that sub-frame, transmit to the WCD a downlink control information (DCI) message that specifies the assigned resource blocks and coding rate, and (ii) encode and transmit the data to the WCD in the assigned resource blocks of the sub-frame. Per the DCI message, the WCD would then read the transmitted data from the assigned resource blocks.

Likewise, when the WCD has data to transmit to the base station and accordingly transmits a scheduling request to the base station, the base station may assign certain uplink resource blocks in a given sub-frame to carry the data from the WCD at a particular coding rate. The base station may then transmit to the WCD, in advance of that sub-frame, a DCI message that specifies the assigned resource blocks and coding rate. The WCD may then encode and transmit the data to the base station in the assigned resource blocks in that sub-frame.

With such an arrangement, the bandwidth of the carrier frequency on which the base station serves a WCD may pose an effective limit on the peak rate of data communication between the base station and the WCD. For instance, the bandwidth might define only a limited number of resource blocks per slot, with the data rate per resource block being further limited based on air interface conditions. By way of example, in accordance with the LTE standard, the spectrum associated with an FDD carrier frequency may be up to 20 MHz wide. Depending on the FDD frame format (e.g., how many sub-frames per frame are used for downlink versus uplink) and other factors, such a carrier frequency may accommodate peak downlink data rate of only 60 megabits per second (Mbps).

One way to help overcome this per-carrier-frequency data rate limitation is to have a base station serve a WCD on multiple carrier frequencies at once, providing what is known as a "carrier aggregation" service. With carrier aggregation, multiple carriers from either contiguous frequency bands or non-contiguous frequency bands are aggregated together as "component carriers." This may increase the overall bandwidth available per slot by providing a greater extent of air interface resources in which the base station can schedule uplink and downlink communication from and to the WCD. For instance, if a base station serves a WCD on two 20 MHz FDD LTE downlink channels at once, the peak throughput may be about 120 Mbps. If the base station serves a WCD on three 20 MHz FDD LTE downlink channels at once, the peak throughput may be as high as 180 Mbps. With carrier aggregation, one of the carrier frequencies may be deemed to be a primary carrier frequency or primary cell (PCell) and each other carrier frequency may be deemed to be a secondary carrier frequency or secondary cell (SCell).

In some situations, the base station (or an associated system) may determine that a WCD subject to carrier aggregation is in poor wireless conditions (e.g., based on measurement reports provided by the WCD indicating poor downlink conditions and/or based on the quality of signals received on the uplink channel(s) from the WCD, among other possibilities). In these situations, the WCD may be far away from the serving base station, or the WCD's coverage may be impaired by interference and/or physical constraints. The base station may responsively engage in a partial inter-frequency transition of the WCD. In particular, the partial inter-frequency transition may involve exchanging a high-frequency uplink channel with a low-frequency downlink channel, while leaving a high-frequency downlink channel and a low-frequency uplink channel in place. The result of this transition may be that, for the carrier aggregation service of the WCD, the two uplink channels would be at the lower end of the frequency spectrum and the two downlink channels would be at the higher end of the frequency spectrum. This may be beneficial in that the lower frequency will allow for easier communication (better propagation, due to lower path loss) of the WCD's uplink channel transmissions to the base station. The downlink channel communications may not be significantly degraded, as the base station can transmit at a higher power level than the WCD.

Accordingly, in a first example embodiment, a wireless air interface may be defined for communication with a WCD. The wireless air interface may include paired low-frequency channels and paired high-frequency channels, where the paired low-frequency channels include a low-frequency downlink channel and a low-frequency uplink channel, and where the paired high-frequency channels include a high-frequency downlink channel and a high-frequency uplink channel. It may be determined that, on at least one of the downlink or uplink channels, the WCD is experiencing a quality of wireless coverage below a threshold wireless coverage value. Possibly in response to the WCD experiencing the quality of wireless coverage below the threshold wireless coverage value, the downlink and uplink channels may be reconfigured so that the paired low-frequency channels include two low-frequency uplink channels and the paired high-frequency channels include two high-frequency downlink channels.

A second example embodiment may include a non-transitory, computer-readable storage medium, having stored thereon program instructions that, upon execution by a computing device, cause the computing device to perform operations in accordance with the first example embodiment.

A third example embodiment may include a computing device containing at least a processor and data storage. The data storage may include program instructions that, when executed by the processor, cause the computing device to perform operations in accordance with the first example embodiment.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the embodiments as claimed.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Further, unless context suggests otherwise, the features illustrated in each of the figures may be used in combination with one another. Thus, the figures should be generally viewed as aspects of one or more overall embodiments, with the understanding that not all illustrated features are necessary for each embodiment.

1. Example Wireless Communication System

Figure 1:
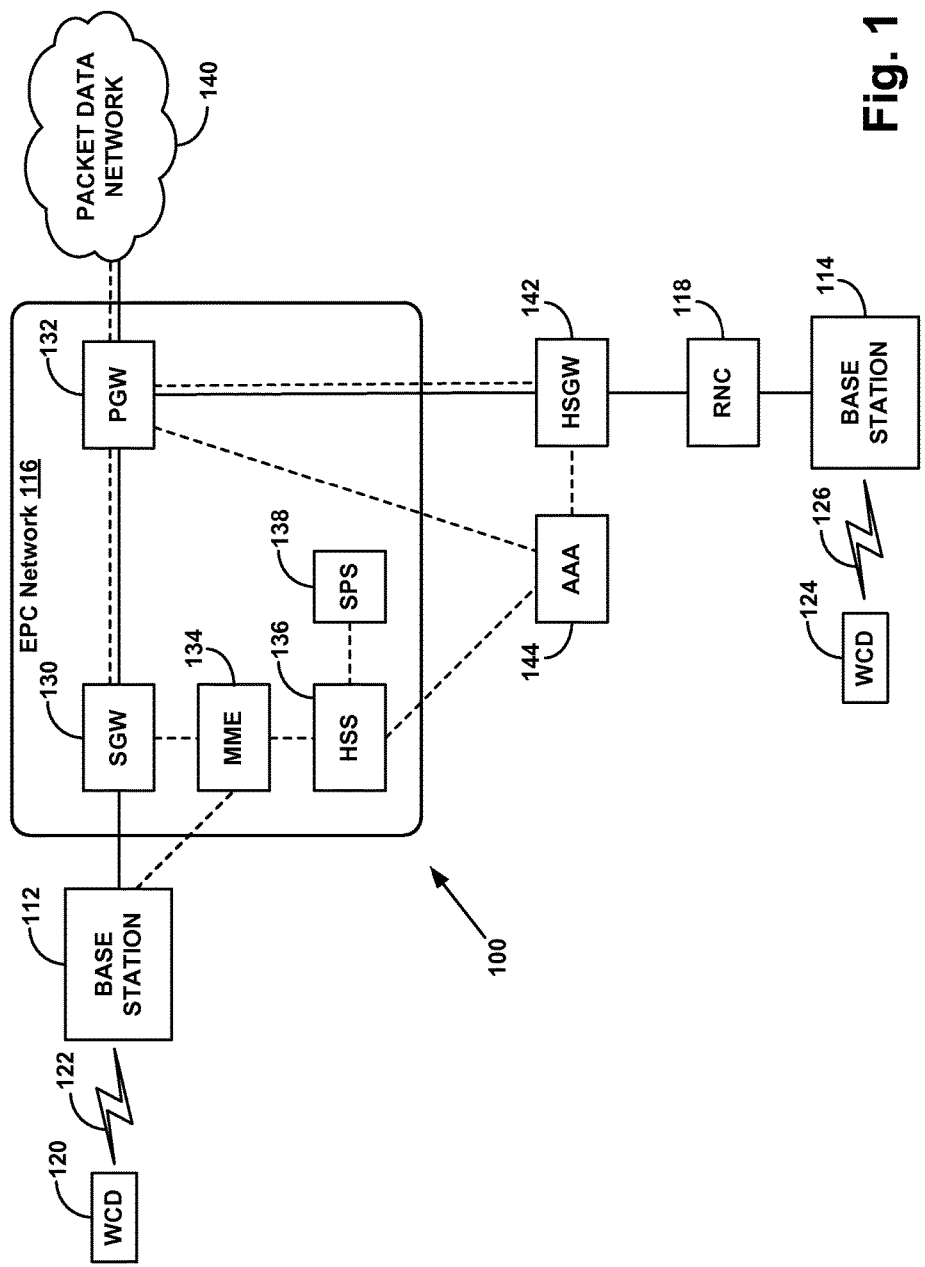
FIG. 1 is a block diagram of a wireless communication system, in accordance with example embodiments.

FIG. 1 illustrates example wireless communication system 100, which may be related to aspects of the present disclosure. In this example, wireless communication system 100 includes two different types of base stations, exemplified by base station 112 and base station 114. Base station 112 (e.g., an eNodeB) is part of an evolved RAN that uses an Evolved Packet Core (EPC) network 116. Base station 114 is part of a legacy RAN that includes a radio network controller (RNC) 118. Base stations 112 and 114 each provide one or more respective wireless coverage areas through which the respective base stations can communicate with one or more WCDs. The wireless coverage areas provided by base stations 112 and 114 could be either overlapping or non-overlapping.

A WCD may be referred to as user equipment (UE). For instance, WCDs 120 and 124 could be wireless telephones, wirelessly-equipped handheld, tablet, or laptop computers, or any other type of WCD. Despite this nomenclature, a WCD need not be an end-user device, and may include various types of devices that have limited interactions with human users.

In FIG. 1, connections that carry bearer traffic are indicated by solid lines, connections that carry signaling traffic are indicated by dashed lines, and connections that carry both bearer traffic and signaling traffic are indicated by solid lines in combination with dashed lines. However, both bearer and signaling traffic may be communicated using interfaces and/or paths not explicitly marked as such in FIG. 1.

As shown, base station 112 is in wireless communication with WCD 120 via an air interface 122, and base station 114 is in wireless communication with WCD 124 via an air interface 126. Each of air interfaces 122 and 126 may include downlink channels for communication from the RAN to WCDs, and uplink channels for communication from the WCDs to the RAN.

Base stations 112 and 114 may communicate with WCDs using different air interface protocols. In one example, base station 112 communicates with WCDs, such as WCD 120, using a Long Term Evolution (LTE) protocol, whereas base station 114 communicates with WCDs, such as WCD 124, using a High Rate Packet Data (HRPD) protocol, such as Evolution Data-Only (EVDO). These air interface protocols, however, are given merely as illustrative examples. In general, base stations 112 and 114 may communicate using any air interface protocol that is known currently or may be developed.

As shown in FIG. 1, EPC network 116 includes a serving gateway (SGW) 130, a packet gateway (PGW) 132, a mobility management entity (MME) 134, a home subscriber server (HSS) 136, and a subscriber profile store (SPS) 138. PGW 132 may provide connectivity to a packet data network 140. SGW 130 may support the exchange of Internet Protocol (IP) bearer traffic between base station 112 and PGW 132. MME 134 may manage signaling traffic between base station 112 and various elements in EPC network 116, for example, relating to authentication of WCDs and activating and de-activating bearer connections for WCDs. HSS 136 may be configured to authenticate WCDs, as well as to access subscriber profiles stored in SPS 138. For example, SPS 138 may store subscriber profiles for WCDs that are authorized to use EPC network 116.

With this configuration, EPC network 116 can provide packet data connections to packet data network 140 for WCDs served by base stations in an evolved RAN, for example, WCD 120 served by base station 112. The packet data connections that EPC network 116 provides to WCDs may, in turn, be used for web access, email, text, voice-over-IP (VoIP), video, streaming media, gaming, and/or other packet data services.

WCD 120 may engage in signaling with base station 112 to establish a radio-link-layer connection (i.e., air interface connection) on a particular carrier frequency, so that base station 112 may then serve WCD 120 on that carrier frequency. For instance, WCD 120 and base station 112 may exchange radio resource control (RRC) configuration messaging in order to prepare base station 112 to serve the WCD 120 on the carrier frequency, and to prepare WCD 120 to be served on the carrier frequency. In this process, base station 112 may store a context record for WCD 120, indicating that base station 112 is serving WCD 120 on the particular carrier frequency, so that base station 112 may then serve WCD 120 on the indicated carrier frequency (e.g., then exchanging signaling and bearer traffic with WCD 120 on that carrier frequency) per that context record. Further, WCD 120 may store a context record indicating that WCD 120 is being served on that carrier frequency, so that WCD 120 can then be served on that carrier frequency (e.g., then exchanging signaling and bearer traffic with base station 112 on that carrier frequency) per that context record. As such, the radio-link-layer connection could be considered to initially encompass just that one carrier frequency.

In addition, during this initial attach process and/or later while serving WCD 120, base station 112 and WCD 120 may engage in RRC configuration messaging and/or other processing to modify or otherwise set the radio-link-layer connection to encompass a different number of carrier frequencies. In particular, base station 112 and WCD 120 may arrange the radio-link-layer connection to encompass two or more carrier frequencies so as to facilitate a carrier aggregation service.

In addition, EPC network 116 may provide packet data connections to packet data network 140 for WCDs served by other RANs, such as WCDs served by legacy RANs. In the example shown in FIG. 1, wireless communication system 100 includes an HRPD serving gateway (HSGW) 142 that supports interworking between EPC network 116 and a legacy RAN, the latter exemplified in FIG. 1 by base station 114 and RNC 118. This interworking may involve (i) HSGW 142 communicating with an authentication, authorization, and accounting (AAA) server 144, which, in turn, may communicate with HSS 136, and (ii) HSGW 142 communicating with PGW 132.

For example, WCD 124, when served by base station 114, may transmit a data-connection request that relates to establishing a packet data connection. HSGW 142 may receive the data-connection request via base station 114 and RNC 118, and, in response, communicate with AAA 144 to authenticate WCD 124. As part of the authentication process, AAA 144 may perform various functions, such as communicating with HSS 136, issuing an authentication challenge to WCD 124, evaluating a response from WCD 124 to the authentication challenge, and indicating to HSGW 142 whether the authentication process is successful or unsuccessful. If the authentication process is successful, HSGW 142 may communicate with PGW 132 to request a packet data connection to packet data network 140 for WCD 124. In response to the request from HSGW 142, PGW 132 may communicate with AAA 144 to authenticate WCD 124 in another authentication process. If that authentication process is successful, PGW 132 may establish the packet data connection, which then enables WCD 124 to communicate with packet data network 140 via air interface 126, base station 114, RNC 118, HSGW 142, and PGW 132.

In general, the depictions of FIG. 1 are illustrative. Therefore, in a RAN, there could be more or fewer of each element than is shown, and some elements may be omitted altogether. Additionally, other types of elements not shown may be present. Further, any of these elements may be combined with one another, physically or logically, or distributed across multiple physical devices. Thus, the particular arrangement shown in FIG. 1 should not be viewed as limiting. Moreover, various disclosed functions can be implemented by any combination of hardware, firmware, and/or software, such as by one or more processors programmed to execute computer instructions for instance.

2. Example Computing Device

Figure 2:
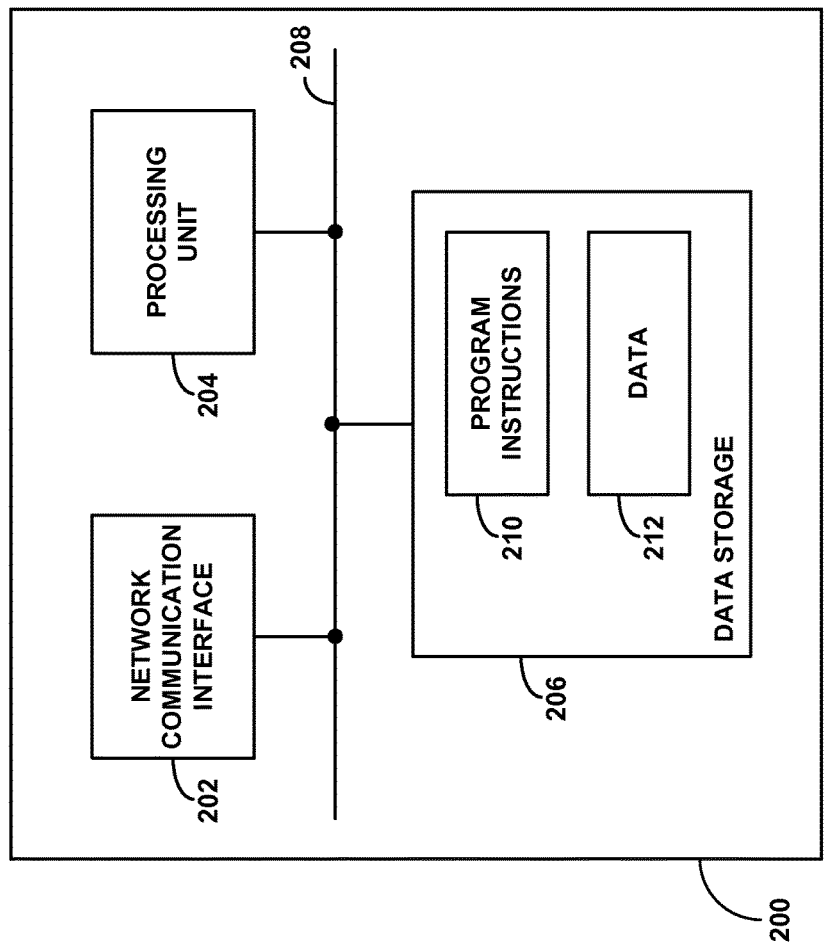
FIG. 2 is a block diagram of a computing device, in accordance with example embodiments.

FIG. 2 is a block diagram of example computing device 200. Computing device 200 could be a standalone general purpose or specialized computing device. Alternatively, computing device 200 could be a WCD or a part of the RAN. Thus, computing device 200 may represent a smartphone, tablet computer, personal computer, base station, MME, SGW, PGW, or some other type of computer or RAN component.

As shown, computing device 200 includes a network communication interface 202, a processing unit 204, and data storage 206, all of which may be communicatively linked together by a system bus, network, or other connection mechanism 208. Computing device 200 may also include additional components, functions and/or interfaces not shown in FIG. 2, such as a keyboard, a mouse, a touch screen, a monitor, a printer, and/or one or more ports that interface with such devices, for example a universal serial bus (USB) or high-definition multimedia interface (HDMI) port.

Network communication interface 202 may support communication with various other network entities, such as any of the network entities shown in FIG. 1. As such, interface 202 may include one or more network interface modules, such as Ethernet, Wifi, BLUETOOTH®, and/or wide-area wireless connection network interface modules, or any other type of wired and/or wireless communication interfaces.

Processing unit 204 may comprise one or more general purpose processors (e.g., microprocessors) and/or one or more special purpose processors (e.g., application specific integrated circuits, digital signal processors, and/or network processors). Data storage 206 may comprise one or more volatile and/or non-volatile non-transitory storage components, such as optical, magnetic, or flash storage, and may be integrated in whole or in part with processing unit 204.

As shown, data storage 206 may hold program instructions 210 and data 212. Program instructions 210 may be executable by processing unit 204 to carry out various functions described herein and/or depicted in the accompanying drawings. Data 212 could be any data that is generated, received, stored, or used in connection with carrying out such functions.

3. Carrier Aggregation

Carrier aggregation is an optional feature supported by some network technologies, such as LTE-Advanced. Carrier aggregation may be used to increase the wireless bandwidth, and thus the data rate, between a RAN and a WCD. Carrier aggregation may be enabled for both downlink and uplink channels.

Carrier aggregation allows the RAN to assign, to a WCD, capacity from two or more carrier frequencies at the same time. Without carrier aggregation, the rate at which a WCD can receive data is limited by the WCD's assigned bandwidth, which is usually centered near the WCD's assigned carrier frequency. If the data that the RAN transmits on this carrier frequency is subject to distortion, interference, reflections, or attenuation, the effective data rate that the WCD receives may be less than its theoretical maximum data rate.

However, if more than one carrier frequency is assigned to the WCD, the WCD may utilize bandwidth associated with each of these carrier frequencies. As a result, the WCD's theoretical maximum data rate can be increased. For instance, if three carrier frequencies are assigned to a WCD, the WCD's theoretical maximum data rate may be approximately tripled.

Along with increasing the WCD's theoretical maximum data rate, carrier aggregation is likely to also increase the WCD's effective data rate. Even if all of the assigned carrier frequencies are subject to some distortion, interference, reflections, or attenuation, the WCD's effective data rate is likely to be greater than if the WCD was assigned only one carrier frequency. Further, since wireless channel characteristics may be different for each frequency, with carrier aggregation, the WCD is more likely to be assigned at least one carrier frequency on which the signals received by the WCD are subject to less distortion, interference, reflections, or attenuation. Thus, when receiving data on this carrier frequency, the WCD may be able to achieve a high effective data rate.

Figure 3A:
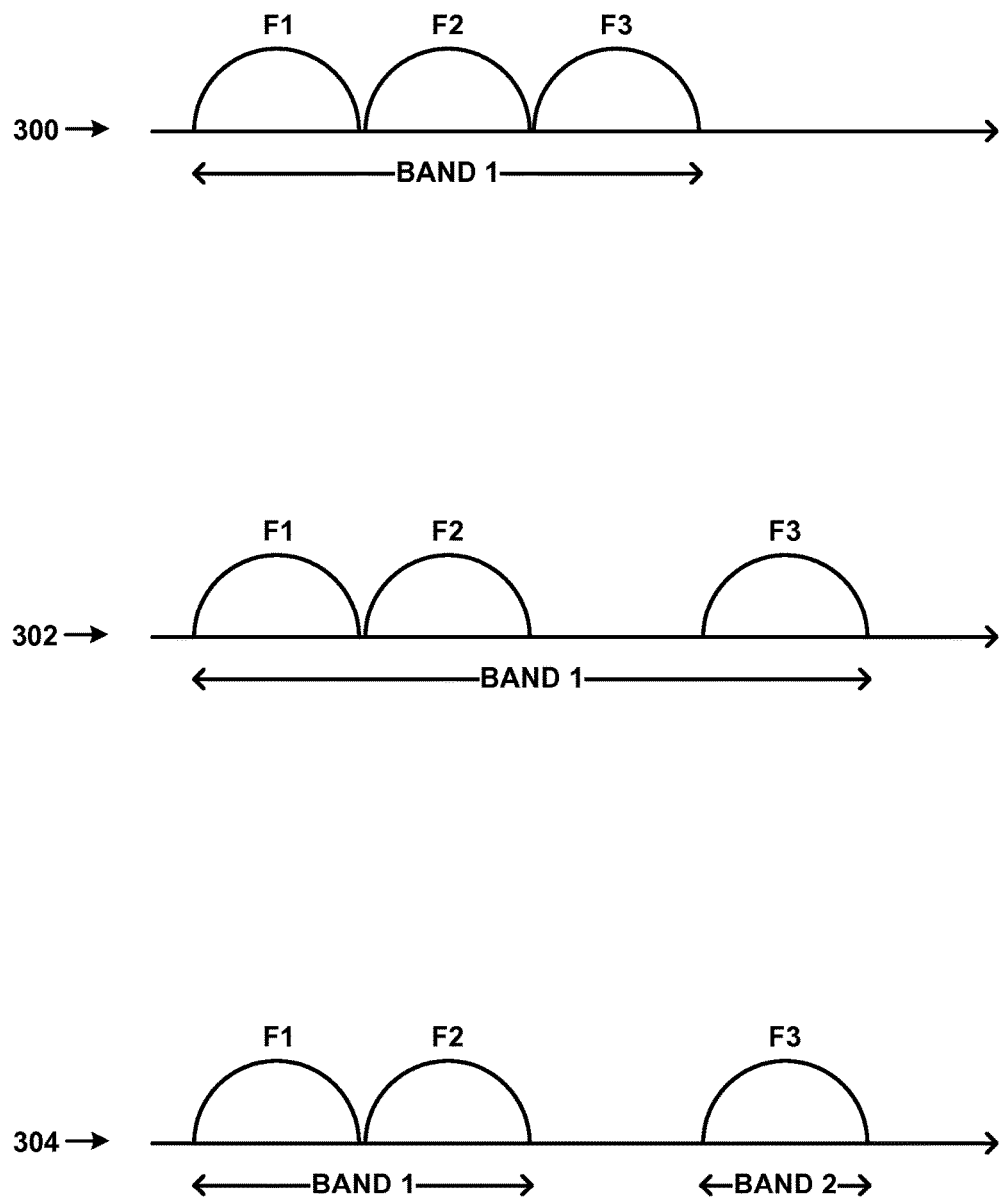
FIG. 3A illustrates various frequency arrangements for carrier aggregation, in accordance with example embodiments.

FIG. 3A illustrates three possible arrangements of carrier aggregation, in accordance with example arrangements. Each of these arrangements involve the aggregation of three carrier frequencies, but in practice the number of carrier frequencies aggregated may be two or more than three. Further, in FDD systems, the depicted carrier frequencies may include both a downlink frequency and an uplink frequency. FIG. 3A, however, does not illustrate separate downlink and uplink frequencies. Thus, carrier frequencies F1, F2, and F3 may each include distinct downlink and uplink frequencies. For instance, each carrier frequency may be the midpoint of a spectrum that possibly includes distinct uplink and downlink frequencies.

Arrangement 300 involves assignment, to a WCD, of three contiguous carrier frequencies (F1, F2, and F3) in the same band. Thus, the WCD may be able to treat these aggregated carrier frequencies as if they were a single enlarged channel. In this instance, the WCD may be able to use only one transceiver to transmit and receive data on all three carrier frequencies.

Arrangement 302 involves assignment, to a WCD, of at least some non-contiguous carrier frequencies in the same band. Carrier frequencies F1 and F2 are contiguous with one another, but F3 is not contiguous with either of F1 or F2. As such, the WCD might use two or more transceivers to transmit and receive data on all three carrier frequencies.

Similarly, arrangement 304 involves the assignment, to a WCD, of at least some non-contiguous carrier frequencies in different bands. Carrier frequencies F1 and F2 are contiguous with one another in band 1, but F3 is in band 2 and therefore not contiguous with either of F1 or F2. In this case as well, the WCD may use two or more transceivers to transmit and receive data on all three carrier frequencies.

When carriers are aggregated, each carrier frequency may be referred to as a component carrier frequency. Of the component carrier frequencies, one may be a primary carrier frequency (referred to as a PCell) and the others may be secondary carrier frequencies (referred to as SCells). The primary carrier frequency may be the carrier frequency that the WCD receives with the strongest signal. However, other factors may be taken into account as well, or instead of, signal strength when assigning a primary carrier frequency. The PCell and one or more SCells assigned to a particular WCD may be differentiated from one another with an index that takes on values from 0-7, for example. The index value of 0 may refer to the PCell and the remaining index values of 1-7 may each refer to an SCell.

In some embodiments, all signaling between the WCD and RAN can take place on the primary carrier frequency, while the primary and secondary carrier frequencies are used for data transmission. Nonetheless, implementations in which signaling takes place on one or more secondary carrier frequencies may be possible.

With carrier aggregation, each component carrier frequency may be used to define a different wireless coverage area. In order for the carrier frequencies from different wireless coverage areas to be used to transmit data to a particular WCD, these wireless coverage areas may overlap to some extent.

Figure 3B:
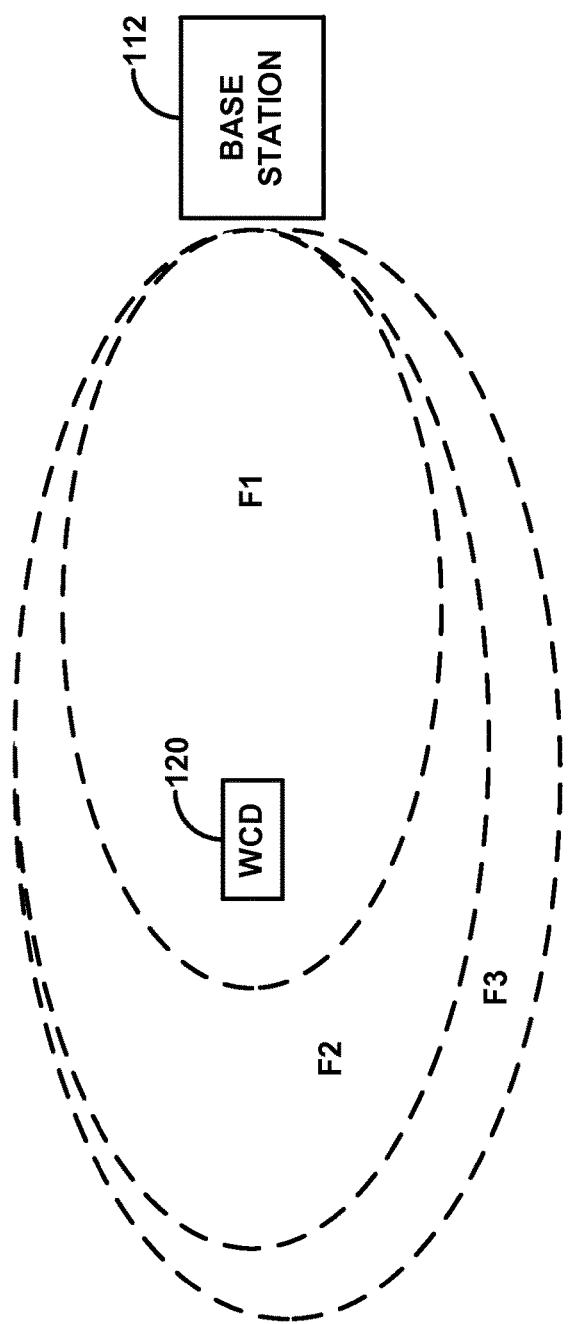
FIG. 3B depicts the coverage of several wireless coverage areas each defined by different carrier frequencies, in accordance with example embodiments.

FIG. 3B depicts the coverage of several wireless coverage areas each defined by different carrier frequencies. In FIG. 3B, base station 112 defines three wireless coverage areas defined by carrier frequencies F1, F2, and F3, respectively. Each of these wireless coverage areas provide progressively more coverage. The wireless coverage area defined by carrier frequency F2 provides a superset of the coverage provided by the wireless coverage area defined by carrier frequency F1. Likewise, the wireless coverage area defined by carrier frequency F3 provides a superset of the coverage provided by the wireless coverage area defined by carrier frequency F2. Other overlapping or partially overlapping sets of wireless coverage areas may also be used for carrier aggregation.

WCD 120 is located within the coverage of each of these wireless coverage areas. Thus, WCD 120 may be able to use carrier aggregation to communicate with base station 112 using any two or all three of these wireless coverage areas.

Figure 3C:
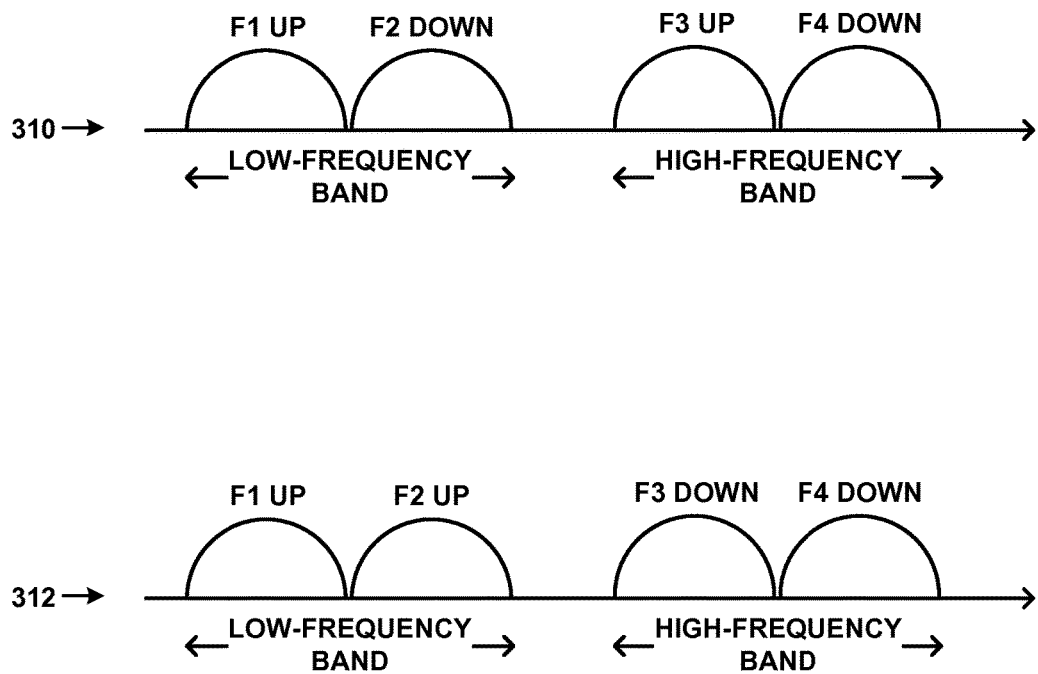
FIG. 3C illustrates a reconfiguration of frequency arrangements for carrier aggregation, in accordance with example embodiments.

FIG. 3C depicts two possible arrangements of FDD carrier aggregation. In arrangement 310, a WCD is assigned two carrier frequencies, one in low-frequency band and another in a high-frequency band. From each of these carrier frequencies, pairs of respective downlink and uplink frequencies may be derived. For instance, in the low-frequency band, frequency F1 may be used for an uplink and frequency F2 may be used as a downlink, while in the high-frequency band, frequency F3 may be used as an uplink and frequency F4 may be used as a downlink. Unlike FIG. 3A, FIG. 3C depicts separate uplink and downlink frequencies.

The low-frequency and high-frequency bands may be located in various points within the wireless spectrum, so long as the low-frequency band uses lower carrier frequencies than the high-frequency band. As one possible example, the low frequency band may use carrier frequencies of around 1900 MHz, while the high-frequency band may use carrier frequencies of around 2500 MHz. Alternatively, the low frequency band may use carrier frequencies of around 900 MHz, while the high-frequency band may use carrier frequencies of around 1800 MHz. Other arrangements may be possible. In some situations, the pair of downlink and uplink frequencies in the low-frequency band may define a PCell, and the pair of downlink and uplink frequencies in the high-frequency band may define an SCell.

As noted above, a WCD and its serving base station may exchange RRC configuration messaging to set or adjust the carrier frequencies on which the WCD may communicate with the base station. For instance, to establish the arrangement of FIG. 3C, the base station may transmit an RRC connection request message to the WCD. This message may specify the carrier frequencies on which the eNodeB will be serving the UE, identifying each carrier frequency by its global identifier for instance.

TABLE 1

| | EUTRA band indicator/name | | | | |
|---|---|---|---|---|---|
| 1/2100 | 2/1900 PCS | 3/ 1800+ | 4/ AWS 1 | 5/850 | 6/ UMTS |
| Downlink base frequency ($DL_{BASE}$) 2110 | 1930 | 1805 | 2110 | 869 | 875 |
| Downlink offset ($DL_{OFF}$) 0 | 600 | 1200 | 1950 | 2400 | 2650 |
| Downlink EARFCN Identifier ($DL_{ID}$) range 0-599 | 600-1199 | 1200-1949 | 1950-2399 | 2400-2649 | 2650-2749 |
| Uplink base frequency ($UL_{BASE}$) 1920 | 1850 | 1710 | 1710 | 824 | 830 |
| Uplink offset ($UL_{OFF}$) 18000 | 18600 | 19200 | 19950 | 20400 | 20650 |
| Uplink EARFCN identifier ($UL_{ID}$) range 18000-18599 | 18600-19199 | 19200-19949 | 19950-20399 | 20400-20649 | 20650-20749 |
| Duplex spacing (SPC) 190 | 80 | 95 | 400 | 45 | 45 |

As one possible example, the RRC connection request message may contain a global indicator of each of frequencies F1, F2, F3, and F4, organized so that frequencies F1 and F2 are an uplink/downlink pair (e.g., in a PCell) and F3 and F4 are a different uplink/downlink (e.g., in a SCell). The global identifiers may be based on evolved UMTS terrestrial radio access (EUTRA) band indicators as shown in Table 1.

As an example, an RRC connection request message may include, for the PCell and each SCell, a respective extended absolute radio-frequency channel number (EARFCN). From this EARFCN, a downlink frequency ($DL_F$) and an uplink frequency ($UL_F$) may be derived according to the following formulas:

$$DL_F = DL_{BASE} + 0.1(DL_{ID} - DL_{OFF})$$

$$UL_F = DL_F - SPC$$

For instance, if an EARFCN of 900 is used to identify the PCell, EUTRA band 2 is indicated. Accordingly, the downlink frequency will be $DL_F = 1930 + 0.1(900-600) = 1960$ MHz, and the uplink frequency will be $UL_F = 1960 - 80 = 1880$ MHz. Alternatively, the following formulas may be used:

$$UL_F = UL_{BASE} + 0.1(UL_{ID} - UL_{OFF})$$

$$DL_F = UL_F + SPC$$

Then, to identify the same downlink and uplink frequencies, an EARFCN of 18900 can be used for the PCell. Accordingly, the uplink frequency will be $UL_F = 1850 + 0.1(18900-18600) = 1880$ MHz, and the downlink frequency will be $DL_F = 1880 + 80 = 1960$ MHz.

In other embodiments, a respective downlink EARFCN and a respective uplink EARFCN may be separately specified in the RRC connection request message. From these EARFCNs, an uplink frequency ($UL_F$) and a downlink frequency ($UL_D$) may be derived according to the following formulas:

$$DL_F = DL_{BASE} + 0.1(DL_{ID} - DL_{OFF})$$

$$UL_F = UL_{BASE} + 0.1(UL_{ID} - UL_{OFF})$$

Thus, for instance, the EARFCNs of 900 and 18900 could each be specified, resulting in a downlink frequency of 1960 MHz and an uplink frequency of 1880 MHz being assigned to the WCD.

This or another process could be used to add or remove one or more carrier frequencies from a WCD's radio-link-layer connection. For example, if the connection currently encompasses just one carrier frequency, the process could be used to change the connection to encompass a different carrier frequency and/or to add one or more additional carrier frequencies (e.g., as SCells) so as to facilitate carrier aggregation service. As another example, if the connection currently encompasses two or more carrier frequencies, the process could be used to add one or more additional carrier frequencies to the connection so as to provide increased carrier aggregation, or to remove one or more carrier frequencies from the connection so as to provide reduced carrier aggregation or to switch to single-carrier service. Other examples are possible as well.

As noted previously, it may be determined that a WCD subject to carrier aggregation is in poor wireless conditions. This determination may be based on measurement reports provided by the WCD indicating poor downlink conditions and/or based on the quality of signals received on the uplink from the WCD, among other possibilities.

One way in which a WCD may report signal quality in an LTE system is by transmitting a channel quality indication (CQI) in the reverse direction. A CQI report may be carried by a physical uplink control channel (PUCCH) or a physical uplink shared channel (PUSCH) of the air interface.

TABLE 2

| CQI Value | Modulation | Approximate Transmission Rate |
| --- | --- | --- |
| 0 | N/A | 0 |
| 1 | QPSK | 159 kilobits per second |
| 2 | QPSK | 245 kilobits per second |
| 3 | QPSK | 395 kilobits per second |
| 4 | QPSK | 641 kilobits per second |
| 5 | QPSK | 920 kilobits per second |
| 6 | QPSK | 1.2 megabits per second |
| 7 | 16QAM | 1.5 megabits per second |
| 8 | 16QAM | 2.0 megabits per second |
| 9 | 16QAM | 2.5 megabits per second |
| 10 | 64QAM | 2.9 megabits per second |
| 11 | 64QAM | 3.5 megabits per second |
| 12 | 64QAM | 4.1 megabits per second |
| 13 | 64QAM | 4.7 megabits per second |
| 14 | 64QAM | 5.3 megabits per second |
| 15 | 64QAM | 5.8 megabits per second |

The CQI report may contain a number between 1 and 15 that represents signal quality. The higher this value, the higher the modulation scheme coding rate that the base station may use in subsequent forward direction transmissions (e.g., 2 bits per symbol with quadrature phase-shift keying (QPSK), 4 bits per symbol with 16-point quadrature amplitude modulation (16QAM), 6 bits per symbol with 64-point quadrature amplitude modulation (64QAM), etc.). Higher CQI signal quality numbers may also indicate more symbols transmitted per data slot.

As an example, Table 2 provides a mapping between CQI values and bitrates. In Table 2, each CQI value from 1-15 is associated with a type of modulation (QPSK, 16QAM, or 64QAM). Each CQI value may also be associated with a transmission rate, from 159 kilobits per second for a CQI value of 1 to 5.8 megabits per second for a CQI value of 15. A CQI value of 0 may indicate that the WCD is receiving no signal, or negligible signal strength from the RAN.

Table 2 is just one possible example of a mapping between CQI values and transmission rates. Other mappings are possible that use different CQI values and/or different transmission rates. Additionally, other types of signal quality measurement reports may be used, instead of or in addition to CQI reports.

Alternatively or additionally, a sounding reference signal (SRS) may be used for these purposes. An SRS may be transmitted by a WCD in the uplink direction. These transmissions may occur in response to a trigger (e.g., a request from the base station), periodically, or aperiodically. Such a signal may be used by the base station to estimate the uplink channel quality over a particular range of frequencies, including those on the PCell and any SCells assigned to the WCD.

In addition or as an alternative to CQI measurements and SRSs, other techniques may be used to determine a quality of the WCD's wireless coverage. Regardless, in situations where it is determined that the WCD is experiencing poor wireless coverage, the WCD may be far away from the serving base station, or the WCD's coverage may be impaired by interference or physical constraints. For instance, a CQI value of less than 6 (or some other value) may indicate that the WCD is experiencing poor coverage.

Possibly in response to making such a determination (based on the CQI, SRS, and/or another technique), the base station may responsively engage in a partial inter-frequency transition of the WCD. In particular, the partial inter-frequency transition may involve the base station transmitting an RRC reconfiguration request message to the WCD. This request may seek to exchange a high-frequency uplink channel with a low-frequency downlink channel, while leaving a high-frequency downlink channel and a low-frequency uplink channel in place. The result of this transition may be that, for the carrier aggregation service of the WCD, the two uplink channels would be at the lower end of the frequency spectrum and the two downlink channels would be at the higher end of the frequency spectrum. This may be beneficial in that the lower frequency will allow for easier communication (better propagation, due to lower path loss) of the WCD's uplink transmissions to the base station. The downlink communications may not be significantly degraded, as the base station can transmit at a higher power level than the WCD.

As an example, assume that a WCD is assigned a PCell and one SCell. In the PCell, the WCD is using a downlink frequency of 1960 MHz and an uplink frequency of 1880 MHz, as per the example above. These frequencies may be been assigned using EARFCNs of 900 and/or 18900, respectively. In the SCell, the WCD is using a downlink frequency of 2169 MHz and an uplink frequency of 1979 MHz, which were assigned using EARFCNs of 590 and/or 18590, respectively. Mapping these assignments to arrangement 310, F1 would be an uplink frequency of 1880 MHz, F2 would be a downlink frequency 1960 MHz, F3 would be an uplink frequency of 1979 MHz, and F4 would be a downlink frequency of 2169 MHz.

In some cases, F3, and/or other frequencies, may be subject to interference, distortion or attenuation, resulting in the WCD's wireless coverage being poor. After determining that this is the case, the base station may transmit a RRC reconfiguration request message to the WCD. This message may indicate that F1 and F2 are to be used as uplinks, and F3 and F4 are to be used as downlinks. Consequently, arrangement 312 may be realized in this fashion. Thus, F1 would be an uplink frequency of 1880 MHz, F2 would be an uplink frequency 1960 MHz, F3 would be a downlink frequency of 1979 MHz, and F4 would be a downlink frequency of 2169 MHz.

There are a number of ways in which the RRC reconfiguration request message can indicate arrangement 312. In one case, the same EARFCNs may be transmitted to the WCD, but the message may include a parameter overriding the default configuration of Table 1 such that the EARFCNs of 900 and/or 18900 indicate paired uplink frequencies and the EARFCNs of 590 and/or 18590 indicate downlink frequencies. Alternatively, the pair of uplink frequencies may be indicated by a repeated uplink EARFCN (e.g., 18900 appearing twice in the RRC reconfiguration request message instead of 900 and 18900), and the pair of downlink frequencies may be indicated by a repeated downlink EARFCN (e.g., 590 appearing twice in the RRC reconfiguration request message instead of 590 and 18590). Other techniques are possible.

Although FIG. 3C has been described with the PCell being in the low-frequency band and the SCell in the high-frequency band, other arrangements are possible. For instance, the PCell may be in the high-frequency band and the SCell may be in the high-frequency band. Alternatively, the procedure described above could take place between two SCells.

4. Example Operations

Figure 4:
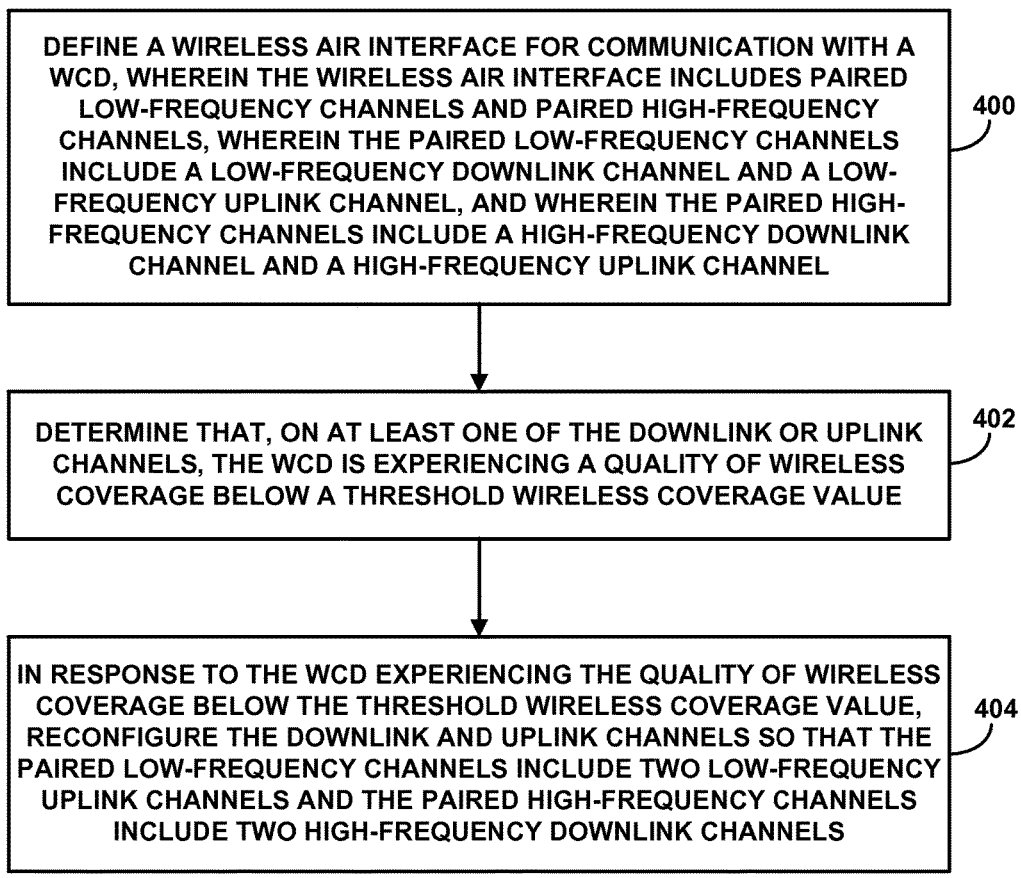
FIG. 4 is a flow chart, in accordance with example embodiments.

FIG. 4 is a flow chart in accordance with example embodiments. The operations illustrated by this flow chart may be carried out by a computing device, such as computing device 200. In some embodiments, computing device 200 may represent a RAN device, such as a base station. Thus, at least some of the following steps may be carried out by a base station. Alternatively, some or all of these steps may be carried out by another type of RAN device. Regardless, computing device 200 may be deployed in a wireless communication system, such as wireless communication system 100, to carry out one or more of these steps.

Further, the operations illustrated in FIG. 4 may be used with any of the frequency arrangements of FIG. 3A, 3B, or 3C.

At block 400 of FIG. 4, a wireless air interface may be defined for communication with a WCD. The wireless air interface may contain paired low-frequency channels and paired high-frequency channels, where the paired low-frequency channels include a low-frequency downlink channel and a low-frequency uplink channel, and where the paired high-frequency channels include a high-frequency downlink channel and a high-frequency uplink channel.

At block 402, it may be determined that, on at least one of the downlink or uplink channels, the WCD is experiencing a quality of wireless coverage below a threshold wireless coverage value.

At block 404, possibly in response to the WCD experiencing the quality of wireless coverage below the threshold wireless coverage value, the downlink and uplink channels may be reconfigured so that the paired low-frequency channels include two low-frequency uplink channels and the paired high-frequency channels include two high-frequency downlink channels. Then, the computing device, such as a base station, may communicate with the WCD via the reconfigured channels.

In some cases, the paired low-frequency channels use frequencies less than 2 gigahertz and the paired high-frequency channels use frequencies greater than 2.4 gigahertz. However, other frequency bands and ranges may be employed.

The reconfiguration may take place during a handover procedure involving the WCD. For instance, the handover may be a partial inter-frequency transition for the WCD, or a handover of the WCD from one base station to another. Each pair of the paired low-frequency channels and the paired high-frequency channels may operate according to frequency-division duplexing.

Determining that, on at least one of the downlink or uplink channels, the WCD is experiencing the quality of wireless coverage below the threshold wireless coverage value may involve receiving, from the WCD, an indication that the WCD is experiencing the quality of downlink wireless coverage below the threshold downlink wireless coverage value. Alternatively or additionally, this step may involve receiving, from the WCD, an indication that the WCD is experiencing the quality of uplink wireless coverage below the threshold uplink wireless coverage value. Thus, this step may involve the RAN receiving a CQI report or an SRS.

Reconfiguring the downlink and uplink channels so that the paired low-frequency channels include two low-frequency uplink channels and the paired high-frequency channels include two high-frequency downlink channels may involve transmitting a connection reconfiguration message to the WCD. The connection reconfiguration message may include an indication that the paired low-frequency channels are to be used as uplink channels and the paired high-frequency channels are to be used as downlink channels. The connection reconfiguration message may also include indications of a low-frequency band used by the paired low-frequency channels, frequencies of each of the paired low-frequency channels, a high-frequency band used by the paired high-frequency channels, and frequencies of each of the paired high-frequency channels.

5. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, example embodiments can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
defining, by a base station, a wireless air interface for communication with a wireless communication device (WCD), wherein the wireless air interface includes paired low-frequency channels and paired high-frequency channels, wherein the paired low-frequency channels include a low-frequency downlink channel and a low-frequency uplink channel, and wherein the paired high-frequency channels include a high-frequency downlink channel and a high-frequency uplink channel;
determining, by the base station, that, on at least one of the downlink or uplink channels, the WCD is experiencing a quality of wireless coverage below a threshold wireless coverage value; and
in response to the WCD experiencing the quality of wireless coverage below the threshold wireless coverage value, reconfiguring, by the base station, the downlink and uplink channels so that the paired low-frequency channels include two low-frequency uplink channels and the paired high-frequency channels include two high-frequency downlink channels.

2. The method of claim 1, further comprising:
communicating, by the base station, with the WCD via the reconfigured channels.

3. The method of claim 1, wherein the paired low-frequency channels use frequencies less than 2 gigahertz and the paired high-frequency channels use frequencies greater than 2.4 gigahertz.

4. The method of claim 1, wherein the reconfiguration takes place during a partial inter-frequency transition procedure involving the WCD.

5. The method of claim 1, wherein determining that, on at least one of the downlink or uplink channels, the WCD is experiencing the quality of wireless coverage below the threshold wireless coverage value comprises:
receiving, from the WCD, an indication that the WCD is experiencing the quality of downlink wireless coverage below the threshold downlink wireless coverage value.

6. The method of claim 1, wherein determining that, on at least one of the downlink or uplink channels, the WCD is experiencing the quality of wireless coverage below the threshold wireless coverage value comprises:
receiving, from the WCD, an indication that the WCD is experiencing the quality of uplink wireless coverage below the threshold uplink wireless coverage value.

7. The method of claim 1, wherein each pair of the paired low-frequency channels and the paired high-frequency channels operate according to frequency-division duplexing.

8. The method of claim 1, wherein reconfiguring the downlink and uplink channels so that the paired low-frequency channels include two low-frequency uplink channels and the paired high-frequency channels include two high-frequency downlink channels comprises the base station transmitting a connection reconfiguration message to the WCD.

9. The method of claim 8, wherein the connection reconfiguration message includes an indication that the paired low-frequency channels are to be used as uplink channels and the paired high-frequency channels are to be used as downlink channels.

10. The method of claim 8, wherein the connection reconfiguration message includes indications of a low-frequency band used by the paired low-frequency channels, frequencies of each of the paired low-frequency channels, a high-frequency band used by the paired high-frequency channels, and frequencies of each of the paired high-frequency channels.

11. An article of manufacture including a non-transitory computer-readable medium, having stored thereon program instructions that, upon execution by a computing device, cause the computing device to perform operations comprising:
defining a wireless air interface for communication with a wireless communication device (WCD), wherein the wireless air interface includes paired low-frequency channels and paired high-frequency channels, wherein the paired low-frequency channels include a low-frequency downlink channel and a low-frequency uplink channel, and wherein the paired high-frequency channels include a high-frequency downlink channel and a high-frequency uplink channel;
determining that, on at least one of the downlink or uplink channels, the WCD is experiencing a quality of wireless coverage below a threshold wireless coverage value; and
in response to the WCD experiencing the quality of wireless coverage below the threshold wireless coverage value, reconfiguring the downlink and uplink channels so that the paired low-frequency channels include two low-frequency uplink channels and the paired high-frequency channels include two high-frequency downlink channels.

12. The article of manufacture of claim 11, the operations further comprising:
communicating with the WCD via the reconfigured channels.

13. The article of manufacture of claim 11, wherein the paired low-frequency channels use frequencies less than 2 gigahertz and the paired high-frequency channels use frequencies greater than 2.4 gigahertz.

14. The article of manufacture of claim 11, wherein reconfiguring the downlink and uplink channels so that the paired low-frequency channels include two low-frequency uplink channels and the paired high-frequency channels include two high-frequency downlink channels comprises a base station transmitting a connection reconfiguration message to the WCD.

15. The article of manufacture of claim 14, wherein the connection reconfiguration message includes indications of a low-frequency band used by the paired low-frequency channels, frequencies of each of the paired low-frequency channels, a high-frequency band used by the paired high-frequency channels, and frequencies of each of the paired high-frequency channels.

16. A computing device comprising:
   at least one processor;
   memory; and
   program instructions, stored in the memory, that upon execution by the at least one processor cause the computing device to perform operations comprising:
   defining a wireless air interface for communication with a wireless communication device (WCD), wherein the wireless air interface includes paired low-frequency channels and paired high-frequency channels, wherein the paired low-frequency channels include a low-frequency downlink channel and a low-frequency uplink channel, and wherein the paired high-frequency channels include a high-frequency downlink channel and a high-frequency uplink channel;
   determining that, on at least one of the downlink or uplink channels, the WCD is experiencing a quality of wireless coverage below a threshold wireless coverage value; and
   in response to the WCD experiencing the quality of wireless coverage below the threshold wireless coverage value, reconfiguring the downlink and uplink channels so that the paired low-frequency channels include two low-frequency uplink channels and the paired high-frequency channels include two high-frequency downlink channels.

17. The computing device of claim 16, the operations further comprising:
   communicating with the WCD via the reconfigured channels.

18. The computing device of claim 16, wherein the paired low-frequency channels use frequencies less than 2 gigahertz and the paired high-frequency channels use frequencies greater than 2.4 gigahertz.

19. The computing device of claim 16, wherein reconfiguring the downlink and uplink channels so that the paired low-frequency channels include two low-frequency uplink channels and the paired high-frequency channels include two high-frequency downlink channels comprises a base station transmitting a connection reconfiguration message to the WCD.

20. The computing device of claim 19, wherein the connection reconfiguration message includes indications of a low-frequency band used by the paired low-frequency channels, frequencies of each of the paired low-frequency channels, a high-frequency band used by the paired high-frequency channels, and frequencies of each of the paired high-frequency channels.

* * * * *